United States Patent [19]
LaTerra

[11] 4,414,113
[45] Nov. 8, 1983

[54] LIQUID PURIFICATION USING REVERSE OSMOSIS HOLLOW FIBERS

[75] Inventor: Terrance LaTerra, Old Bridge, N.J.

[73] Assignee: Ecodyne Corporation, Chicago, Ill.

[21] Appl. No.: 427,863

[22] Filed: Sep. 29, 1982

[51] Int. Cl.³ .................. B01D 13/00; B01D 31/00
[52] U.S. Cl. .................... 210/636; 210/639;
210/652; 210/777; 210/323.2; 210/333.01;
210/340; 210/411; 210/433.2
[58] Field of Search .............. 210/636, 639, 652–655,
210/777, 778, 321, 323.2, 333.01, 340, 341, 411,
433.2, 456, 497.1, 500.2

[56] References Cited
U.S. PATENT DOCUMENTS

| 3,462,362 | 8/1969 | Kollsman | 210/636 |
| 3,526,001 | 8/1970 | Smith | 210/654 |
| 3,557,962 | 1/1971 | Kohl | 210/500.2 |
| 3,704,223 | 11/1972 | Dietzsch et al. | 210/321.1 X |
| 4,002,567 | 1/1977 | Konno et al. | 210/433.2 X |

Primary Examiner—David R. Sadowski
Attorney, Agent, or Firm—Dressler, Goldsmith, Shore, Sutker & Milnamow, Ltd.

[57] ABSTRACT

A method and apparatus for removing dissolved solids from a liquid which utilizes the technique of reverse osmosis (RO). The liquid to be treated is directed into a pressure vessel which contains a plurality of filter elements positioned therein. The filter elements have hollow RO fibers wound around foraminous center cores such that the liquid flows in a direction from the outside of the filter elements towards the center cores. The pure permeate liquid passes into the center bores of the fibers and the concentrate liquid passes into the center cores of the elements.

The method and apparatus provide for the backwashing of the filter elements when they become fouled. Further, an outer filter septum may be applied around the hollow RO fibers of the elements to remove particulate matter which would otherwise foul the hollow RO fibers.

15 Claims, 8 Drawing Figures

LIQUID PURIFICATION USING REVERSE OSMOSIS HOLLOW FIBERS

BACKGROUND OF THE INVENTION

The present invention relates to an improved method and apparatus for removing dissolved solids from a liquid. In particular the invention is directed to an improved method and apparatus for treating a liquid which utilizes the technique of reverse osmosis. The term reverse osmosis is referred to hereinbelow and in the claims as "RO".

In its most basic presentation RO is a membrane process that acts as a molecular filter to remove up to 95–99% of all dissolved minerals, 95–97% of most dissolved organics, and more than 98% of biological and colloidal matter from water. RO can be described as the separation of water from dissolved solids by application of a pressure differential across a membrane which is permeable to water, but not to the dissolved solids. The applied pressure differential must be sufficient to overcome the forces tending to keep the water and dissolved species together. In actual practice, the semi-permeable membrane is contained in a pressure vessel which is compartmentalized by the presence of the membrane. A concentrated solution is introduced under pressure to one side of the membrane and the solvent (water) passes through the membrane. As the solvent is separated from the solution, the solution becomes more and more concentrated. In order to maintain a continuous process, the highly concentrated solution must be drawn off.

The most basic problem in designing an RO device, or a piece of apparatus to use the semi-permeable membrane, is how to package a thin membrane. Flow of water through the membrane is directly proportional to the area of the membrane and inversely proportional to the thickness. Therefore, it is obviously desirable to find some means of packaging the greatest possible area of the thinnest possible membrane. This consideration, and numerous others of varying degrees of importance, have led to the design of three types of RO devices in current use today; the tubular device, the spiral wound device, and the hollow fine fiber device.

The tubular device comprises a semi-permeable membrane which is either inserted into, or coated onto, the surface of a porous tube, which is designed to withstand the operating pressure. Feed water under pressure is introduced into the end of the tube, and the product water permeates through the membrane and the tube, and is collected on the outside. The reject or concentrate exits from the far end of the tube. Although this type of RO device achieved some degree of commercial success, especially in non-water applications such as chemical separations and food and drug processing, the cost of such systems is prohibitively expensive for water treating because of the small membrane area per unit volume of container.

The spiral wound device comprises a jelly roll like arrangement of feed transport material, permeable transport material, and membrane material. At the center of the roll is a perforated permeate collector tube. Several rolls are usually placed end to end in a long pressure vessel. Feed water enters one end of the pressure vessel and travels longitudinally down the length of the vessel in the feed transport layer. Direct entry into the permeate transport layer is precluded by sealing this layer at each end of the roll. As the water travels in a longitudinal direction, some of it passes in the radial direction through the membrane into the permeate transport layer. Once in the transport layer, the purified water flows spirally into the center collection tube and exits the vessel at either end. The concentrated feed continues along the feed transport material and exits the vessel on the opposite end from which it entered.

The hollow fine fiber device comprises a bundle of porous hollow fine fibers. These fibers are externally coated with the actual membrane and form the support structure for it. The hollow fibers are assembled in a bundle lengthwise within a pressure vessel. Feed water under pressure enters the pressure vessel through a highly porous distributor located at the center of the hollow fiber bundle. The distributor runs the entire length of the pressure vessel. Water moves radially outward from the distributor towards the outer shell of the vessel, still essentially at feed pressure. The pressure forces the pure water through the fiber walls into the hollow center of the fiber, and this water moves along the hollow center of each fiber to a tube sheet end, where the fibers have been set in epoxy and cut to allow the pure water to exit. The salts, minerals, and other contaminants remaining in the water move to the outer perimeter of the vessel and are taken out of the vessel through a reject brine port. The fibers at this end are sealed. A hollow fiber membrane allows one to pack the maximum amount of membrane surface area into a given vessel. Accordingly, such devices are more compact than the other devices.

It is the primary function of RO devices to remove dissolved species, and the heretofore designs of RO modules have been optimized to do so in the absence of appreciable quantities of larger suspended material. These larger particles tend to clog the filter surface or the waste stream channels and thereby foul the RO module. It has therefore been the heretofore practice to use conventional filtration and polishing pretreatment equipment to remove suspended matter from the feed water prior to entry into the RO system. The specific pretreatment requirements are determined dependent upon the particular characteristics of the feed water.

It has long been recognized that hollow fiber RO elements are easily fouled due to particulate matter in the feedstream and the precipitation of salts in areas of low flow velocity. This is primarily due to poor flow distribution and the filtering action of the fiber bundle. In current hollow fiber RO elements the feedstream is introduced through a central perforated tube which permits the feedstream to migrate radially outward to the pressure vessel circumference. During this migration, the velocity of the feedstream is reduced due to the removal of permeate and the increasing diameter of the fiber bundle. Current hollow fiber RO devices make no attempt to prefilter the feedstream within the RO pressure vessel. Further, once the current elements have become fouled in the aforementioned manner, the lack of good flow distribution in any direction materially hinders any form of efficient cleaning of the fiber bundle. As hereinabove mentioned, all attempts to remedy this situation have centered on external filtering techniques to reduce the concentration of particulate matter in the entering feedstream.

SUMMARY OF THE INVENTION

The present invention is directed towards a method and apparatus for utilizing hollow RO fibers in a manner which results in much improved flow distribution and permits the use of various cleaning techniques to increase the useful life of the hollow RO fibers. The invention further combines the functions of filtration and reverse osmosis in a single pressure vessel which reduces space requirements and equipment costs.

Briefly stated, the method for removing dissolved solids from a liquid feedstream, in accordance with the invention, includes the passing of the feedstream into a pressure vessel which contains a plurality of filter elements positioned therein. The filter elements have hollow RO fibers wound around foraminous center cores such that the feedstream of liquid to be treated flows in a direction from the outside of the filter elements towards the center cores. In such a manner the substantially pure permeate liquid passes into the center bores of the fibers and the concentrate liquid passes into the foraminous center cores of the elements. Such portion of the feedstream which reaches the foraminous center cores is highly concentrated due to the permeation of some of the feedstream into the center bores of the hollow fibers. This flow pattern minimizes the loss of concentrate velocity due to the removal of the permeate flow by a compensating reduction in area. That is, the surface area of the cylindrical filter elements decrease from the outside to the center core. That portion of the feedstream flow which permeates the hollow RO fibers travels within the center bores thereof and is directed into collectors and removed from the pressure vessel. The concentrated portion of the feedstream flow, which reaches the center cores of the elements, flows through open ends of the cores and is collected for either removal from the pressure vessel or re-introduction through the elements for further concentrating.

The method in accordance with the invention contemplates the periodic backwashing of the filter elements when they become fouled. The elements are backwashed by directing a backwash medium in a reverse direction as the normal flow. That is, the backwash medium flows across the hollow RO fibers. The backwash medium may be either liquid or gaseous or a combination of both. The nature of the design of the apparatus permits the use of various known backwashing techniques.

The method of the invention further contemplates applying an outer filter septum around the layer of hollow RO fibers of the elements to remove particulate matter which would otherwise foul the hollow RO fibers. The outer filter septum may be of an inert fiberous material, of a type generally known in the filtration art, or may be a layer of precoat materials, of a type generally known in the filtration art. In either case, the feedstream liquid initially passes through the outer filter septum whereupon the particulate matter and some of the other impurities are removed prior to reaching the hollow RO fibers. The use of the above described backwashing permits the utilization of the outer filter septum as a pretreatment means within the pressure vessel.

A presently considered preferred embodiment of the apparatus of the invention includes a pressure vessel having a tubesheet dividing the vessel into a influent compartment and a concentrate compartment. A plurality of filter elements, constructed as discussed above, are positioned within the influent compartment. The lower ends of the center cores extend through the tube sheet and are in communication with the concentrate compartment. The lower ends of the hollow RO fibers adjacent the tube sheet are potted in epoxy to seal off these ends and preclude exiting of permeate from these ends of the central bores of the fibers. The upper ends of the hollow fibers are faced to reveal a multiplicity of open hollow fibers. These open ends are in communication with a permeate collector, positioned immediately thereabove for receipt of the permeate liquid. A feedstream inlet line directs liquid to be treated under pressure into the influent compartment. A concentrate outlet line removes concentrate liquid from the concentrate compartment. A permeate outlet line removes permeate liquid from the permeate collector. The concentrate outlet line also serves as a backwash medium inlet line and the feedstream inlet line also serves as a backwash medium outlet line. In the instance where the filter elements are provided with a precoat outer filter septum, the feedstream inlet line serves as an inlet for the precoat material and is thus in communication with an associated precoat handling and application system.

Other advantages, objects and features of the present invention will become apparent upon reading the following detailed description of the preferred embodiments in conjunction with the accompanying drawings.

DESCRIPTION OF THE PREFERRED EMBODIMENTS

Figure 1:
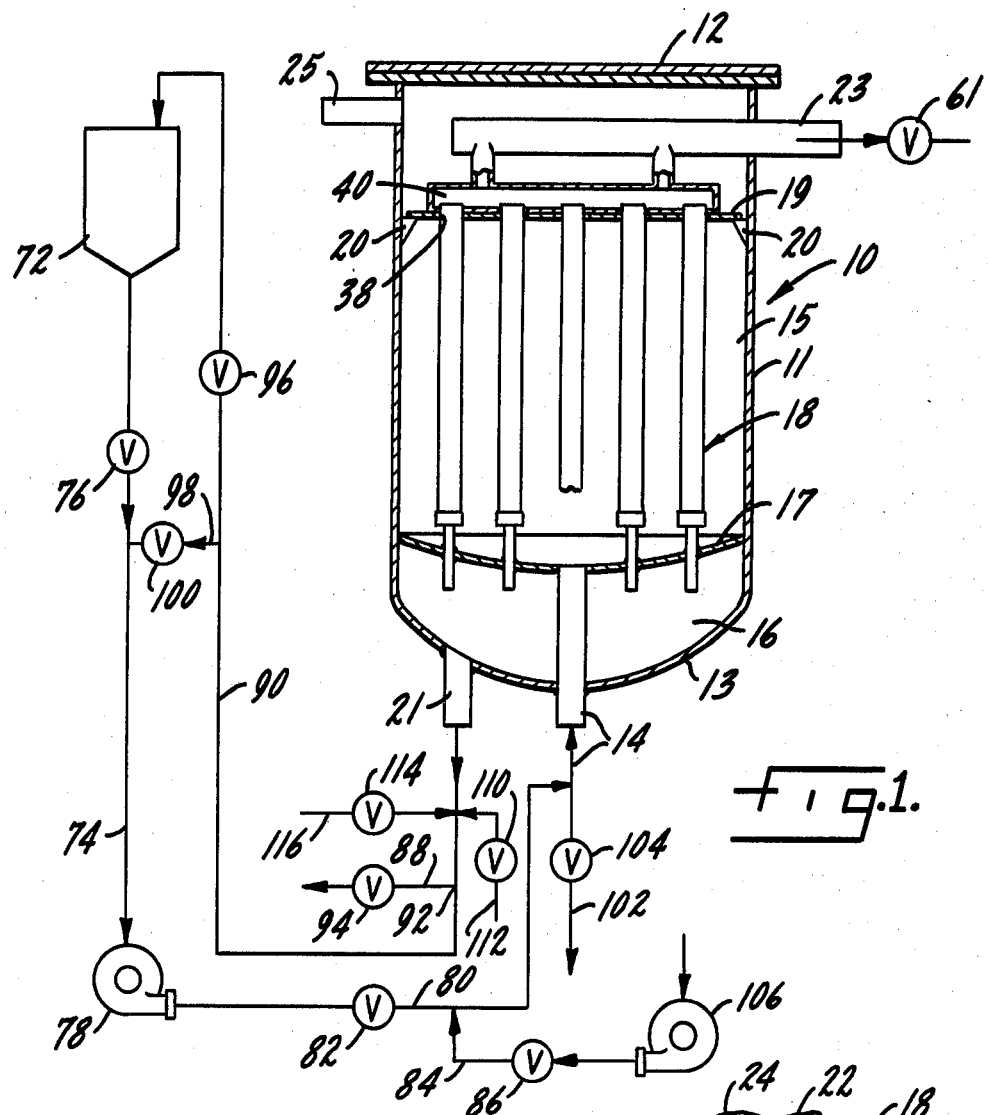
FIG. 1 is a view, partially in section and partially schematic, of a filter apparatus in accordance with the present invention.

Referring now to the drawings, and more particularly to FIG. 1, a filtering system which may be employed to carry out the method of the present invention is generally indicated by the reference numeral 10. The filter device 10 is adapted to receive an influent, filter the influent stream, and discharge the filtrate of effluent stream.

The filter device 10 includes a generally cylindrical pressure vessel 11 made of steel or the like having a removable top cover plate 12 and an outwardly convex bottom 13. The filter vessel 11 is divided into an upper influent zone or compartment 15 and a filtrate zone or compartment 16 by a downwardly curved tube sheet plate 17, suitably secured to the interior of the filter vessel 11 by welding or the like. An influent line 14 extends through the bottom 13 of the vessel and communicates with the influent zone 15 so that the influent liquid is passed directly to the influent zone 15. The influent line 14 is attached to the tube sheet plate 17 by welding or the like. In this manner, direct communication between the influent zone 15 and the filtrate zone 16 is precluded.

Mounted within the influent zone 15 are a plurality of filter elements 18 through which the influent stream must pass before exiting from the influent zone 15. The filter elements 18, constructed in accordance with the invention, have lower ends which extend through the bottom tube sheet plate 17 and upper ends which end through an upper tube sheet plate 19, which is supported on brackets 20 suitably secured to filter vessel 11, as by welding or the like.

Figure 6:
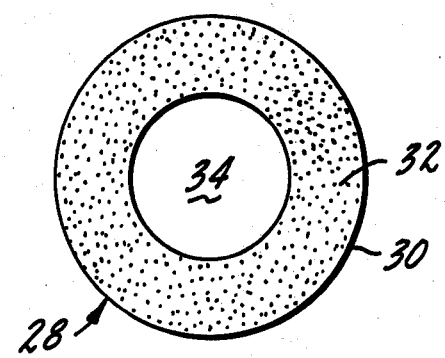
FIG. 6 is a sectional view taken through a hollow RO fiber of the type generally contemplated for use in the present invention.

Referring to FIGS. 2–6, one presently considered preferred embodiment of construction of filter element 18 will now be discussed. Filter element 18 includes a hollow foraminous center core 22 having holes 24 formed therein. Center core 22 is preferably constructed of stainless steel, and the holes 24 are preferably symetrically spaced. A layer 26 of a continuous hollow fine RO fiber 28 is wound around center core 22. Layer 26 is preferably formed by winding a continuous length of hollow RO fiber material 28 onto the center core in a helical fashion. Referring to FIG. 6, hollow RO fibers 28 are asymmetric in that they have a very thin, dense skin 30 at the surface, which inhibits the permeation of impurities but allows the passage of water. Under this skin is a thick porous layer 32 which provides support for the rejecting skin, but because of its high degree of porosity, does not impede the flow of water into the hollow central area or bore 34. An example of such a material is the B-9 hollow fine fiber permeator manufactured by E. I. du Pont de Nemours & Co.

Figure 2:
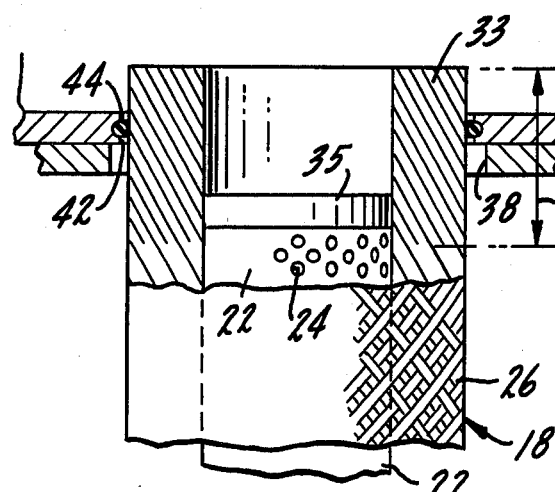
FIG. 2 is a sectional view, partially broken away, taken through an upper portion of a filter element constructed in accordance with the invention.

Referring to FIG. 2, the upper end of the layer 26 of hollow RO fibers is potted in an epoxy material 33, or the like, to seal off the feedstream and the center core 22. The epoxy material in essence serves as a tube sheet for the hollow RO fibers. The upper end of the epoxy material 33 is faced or cut to reveal a multiplicity of open hollow fibers, which, as will hereinbelow become more apparent, permits pure liquid to exit therethrough. A plate or cap 35 is suitably secured within core 22 to close off the upper end of the core 22. The depth of the epoxy material 33, as shown by dimension line 36, preferably extends a short distance below plate 35. As seen in FIGS. 1 and 2, the upper end of filter element 18 extends through an opening 38 in tube sheet 19 and into a collector manifold 40 supported on tube sheet 19. Manifold 40 is provided with openings 42 to receive the upper ends of the filter elements 18 therethrough and is suitably sealed by an O-ring 44, or the like. It should be apparent that the only liquid which may enter into manifold 40 is that which passes through the hollow bores of the hollow RO fibers.

Figure 3:
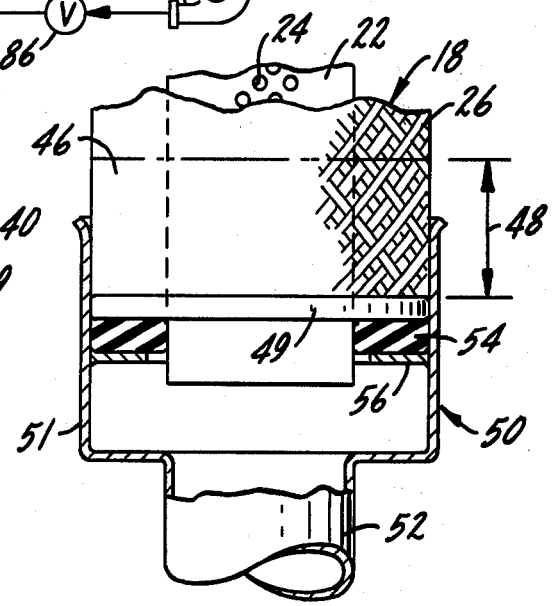
FIG. 3 is a sectional view, partially broken away, taken through a lower portion of a filter element constructed in accordance with the invention.
Figure 4:
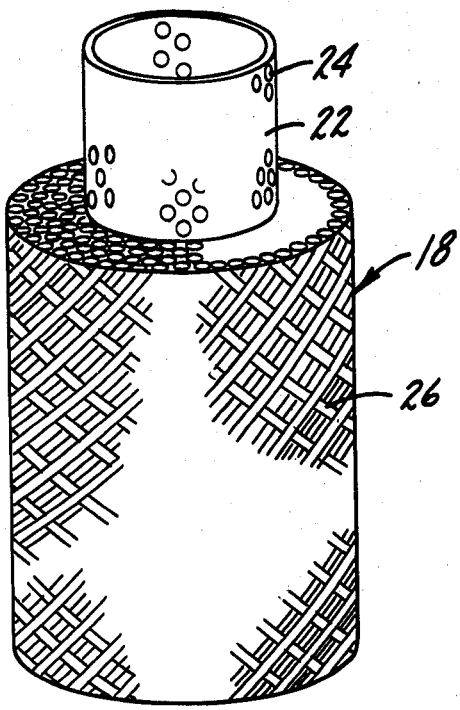
FIG. 4 is a perspective view of a central portion of a filter element constructed in accordance with the invention, partially cut away to show the wound layers of hollow RO fibers and the foraminous center core.
Figure 5:
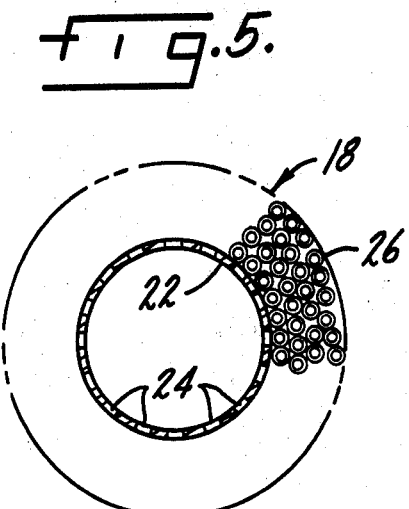
FIG. 5 is a sectional view taken through a portion of the filter element shown in FIG. 4.

Referring to FIG. 3, the lower end of the layer 26 of hollow RO fibers is potted in an epoxy material 46, or the like, to seal these ends of the RO fibers. The depth of the epoxy 46 is indicated by a dimension line 48. An annular ring or end plate 49 may be provided below the epoxy 46. The lower end of the filter element 18 is received within a fitting 50, which extends through and upwardly from tube sheet 17. Fitting 50 is formed with a retaining cup portion 51, which receives the lower end of a filter element 18, and a tube portion 52 which extends through and is welded to tube sheet 17. A sealing means 54 is preferably provided between a support plate 56 and end plate 49 to preclude liquid influent from zone 15 from directly entering into cup portion 51.

It should be apparent that the only liquid which may pass through fitting 50 into effluent zone 16 is that which passes downwardly through center core 22.

An outlet line 21 is provided through bottom 13 to discharge liquid from effluent zone 16. A pure liquid or permeate line 23 is provided above manifold 40 to receive treated liquid from the manifold and remove same from vessel 11. A suitable vent line 25 is also provided adjacent the upper end of vessel 11, of a type well known in the art.

In the operation of the apparatus of FIGS. 1–6, in accordance with the method of the present invention, the feedstream of liquid to be treated is pumped into vessel 11 under pressure through influent line 14 and is directed into influent zone 15. The pressure within vessel 11 is maintained in a well known manner at approximately 300 to 400 psi. The liquid to be treated passes under pressure through the layer 26 of hollow RO fibers of the filter elements 18 and through the holes 24 into the center core 22. During such passage a portion of the liquid feedstream permeates through the skin portions 30 and porous layer 32 into the bores 34 of the hollow RO fibers 30. For reasons well known in the reverse osmosis membrane art, the permeate liquid which enters the bores 34 is substantially free of suspended solids. The permeate liquid passes through the bores 34 and exits from the faced upper ends of the filter elements into manifold 40, whereupon it is removed from vessel 11 through outlet line 23 for ultimate use. The portion of the feedstream liquid which reaches the center cores 22 is highly concentrated due to the permeation of some of the feedstream liquid into the hollow RO fibers. This concentrated liquid flows through the lower ends of the cores 22 through fittings 50 into concentrate or effluent zone 16, whereupon it is removed from vessel 11 through outlet line 21. The concentrate liquid may be disposed of or re-introduced into vessel 11 for further concentrating.

As is apparent from the above description, the liquid flow pattern through the filter elements 18 is from the outside of the layer 26 of hollow RO fibers to the inside of the center core 22. This flow pattern minimizes the loss of concentrate velocity due to the removal of the permeate flow by a compensating reduction in filter area. That is, the surface area of the cylindrical element decreases from the outside of the filter element to the center core. This is the reverse of conventional hollow RO fiber arrangements which remove the concentrate from the outside of the fiber bundle, or the cylinder of greatest surface area. This aspect of the invention provides for better flow distribution.

As will be described in further detail with regards to other preferred embodiments, the use of various backwashing techniques may be utilized to clean the filter elements 18, when they become clogged with particulate matter, by reversing the normal direction of flow through the filter apparatus 10.

Figure 7:
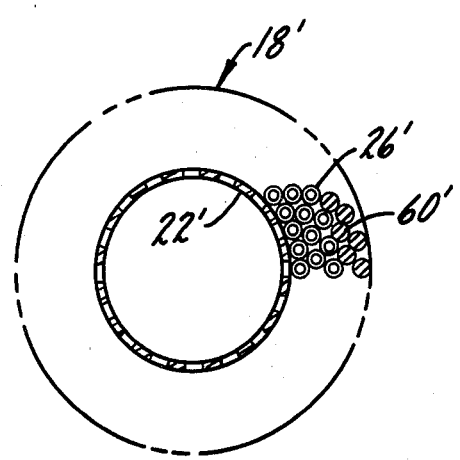
FIG. 7 is a sectional view similar to FIG. 5 showing a second embodiment of a filter element constructed in accordance with the invention.

Referring to FIG. 7, a second preferred embodiment of the filter element is shown and indicated as 18', which is of similar construction to the filter element 18 disclosed above. Filter element 18' includes a foraminous center core 22' about which is wound a layer 26' of hollow RO fibers in a similar manner as discussed with regards to filter element 18. An additional outer layer 60' of inert fibers is applied around layer 26' as an overlay to the layer of hollow RO fibers. This overlay of inert fibers serves as an outer filter septum to remove particulate matter which would otherwise tend to foul the layer of hollow RO fibers. In essence the outer filter septum serves to prefilter the liquid feedstream within the pressure vessel 11, which eliminates the necessity of utilizing external filtering techniques to reduce the concentration of particulate matter. As will be further discussed hereinbelow, by utilizing various types of well known backwashing techniques, the filter elements 18' may be periodically cleaned of collected particulate matter. Examples of fiber materials which may be utilized are cellulose or synthetic fibers, and the like. The application of such a prefiltering outer septum upstream of the hollow RO fibers will also increase the life of the filter elements.

Figure 8:
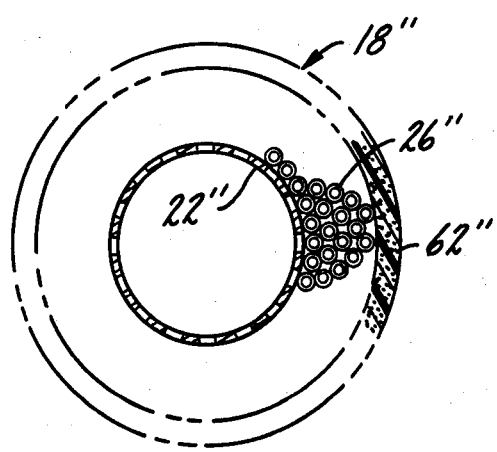
FIG. 8 is a sectional view of the filter element in FIG. 5 showing the addition of a layer of precoat filter aid material.

Referring to FIG. 8, a third preferred embodiment of the filter element is shown and indicated as 18'', which is of substantially identical construction to filter element 18. Filter element 18'' includes a foraminous center core 22'' about which is wound layer 26'' of hollow RO fibers in the manner as discussed above. A layer 62'' of precoat materials is applied as an overlay to the hollow RO fibers to serve as an outer prefilter septum in much the same manner as discussed with regards to filter element 18'. Examples of precoat materials which may be utilized are diatomaceous earth, cellulose fibers, polyacrylonitrile fibers, ion exchange resins, and the like.

An exemplary system to periodically apply the precoat layer 62'' and to backwash the filter elements will now be briefly discussed. Referring to FIG. 1, a liquid slurry of the precoat medium is stored in a precoat tank 72. A slurry line 74, controlled by a slurry valve 76, connects the precoat tank with a slurry pump 78. A transfer line 80 connects the pump 78 with the inlet line 14 of the filter vessel 11. A transfer valve 82, adjacent the pump 78 in the transfer line 80, controls the passage of slurry from pump 78. The feedstream of liquid to be treated enters the filter system 10 through a feed line 84 having an intake control valve 86. The feed line 84 is connected to the transfer line 80 between the control transfer valve 82 and the inlet line 14. The outlet line 21 from the filter vessel 11 is connected to a concentrate outlet line 88 and a precoat return line 90 at a T-junction indicated by reference numeral 92. The concentrate outlet line 88, controlled by control valve 94, is connected to a drain or a suitable recirculation system (not shown). The precoat return line 90 is connected to the precoat tank 72 and has a return valve 96 to control the flow of slurry back to the precoat tank 72. The permeate outlet line 23 is provided with a valve 61 to control the flow through line 23. A bridge line 98, with a bridge valve 100, interconnects the precoat return line 90 and the slurry line 74. A drain line 102, with a control valve 104, communicates with the inlet line 14.

In preparing the filter system 10 for operation the initial step is to precoat the filter elements 18''. To this end the filter vessel 11 is filled with water and a slurry of precoat medium is prepared in the precoat tank 72. During the precoating step all the valves are closed, except the slurry valve 76, the tranfer valve 82, the return valve 96, and the bridge valve 100. The precoating step is initiated by starting the pump 78, thereby drawing the precoat slurry from the precoat tank 72 and through the slurry line 74 to the pump 78. The slurry is forced by the pump 78 through the transfer line 80 and the inlet line 14 into the filter vessel 11. The pressure of the incoming slurry forces the water in the filter vessel 11 to exit via the effluent zone 16 and the outlet line 21. A first portion of the water enters the precoat tank 72 through the return line 90, and a second portion is delivered to the slurry line 74 through the bridge line 98. As cycling continues the precoat slurry is brought into contact with the upstream surfaces of the filter elements 18''. The precoat medium is separated from the slurry and deposited as the precoat layer 62'' upon the upstream surfaces of the layers 26'' of hollow RO fibers. The slurry is circulated through the filter system in this manner until a sufficient depth of precoat layer is deposited upon the upstream surface of the filter elements 18''. The precoat step is terminated by closing the slurry valve 76 and the return valve 96. The filter system 10 is now ready to treat a feedstream of liquid to be treated.

The service run is begun by opening service valve 94 and the intake valve 86. In this manner, untreated liquid enters the filter system 10 through the feed line 84 and passes through the transfer line 80 and the inlet line 14 into the filter vessel 11. A feedstream liquid inlet pump 106 is provided to supply pressure to the liquid feedstream as required to impart the preselected pressure within the filter vessel 11. The pressure of the incoming feedstream liquid forces the liquid through the filter elements 18'' and the effluent zone 16 into the outlet line 21. Following the establishment of the service flow, the transfer valve 82 and bridge valve 100 are closed and the pump 78 is stopped.

The treatment of the liquid passing through the filter vessel 11 is as described hereinabove. That is, the feedstream liquid initially passes through the precoat layer 62'', which serves as a pretreatment means to remove some of the undissolved impurities prior to its reaching the layer 26'' of the filter elements 18''. It should be noted, that, to the extent that the precoat layer includes ion exchange resin particles, dissolved impurities will also be removed from the feedstream liquid. The permeate liquid exits filter vessel 11 through outlet line 23 and the concentrate liquid exits filter vessel 11 through outlet line 21 and line 88.

As the service step continues, a filter cake builds up on and within the precoat layer 62''. Eventually the precoat layer 62'' and/or the layer 26'' of hollow RO fibers will become sufficiently clogged or exhausted and must be backwashed and a new precoat layer 62'' reapplied to the filter elements 18''. At this time the filtering or service cycle is stopped by closing the inlet valve 86 and the service valve 94. The filter vessel 11 is then cleaned. To these ends, the vent 25 and the drain valve 104 are opened, and water plus a cleaning gas, usually air, are passed into the interior of the filter elements 18'' at their lower ends to clean the filter elements 18'' progressively from top to bottom. The air is introduced into the interior of the filter elements 18'' by opening a valve 110 in the air line 112 communicating with the outlet line 21. At the same time water is introduced into the filter elements 18'' by opening a valve 114 in the backwash line 116. Air under pressure and backwash water thereby enter the effluent zone 16 and pass upwardly into the center cores 22'' of the filter elements 18''. The drain valve 104 is preferably controlled so that the water level falls slowly. The air and water entering the filter vessel 11 therefore tend to pass first through the upper portion of the filter elements 18''. As the air and water backwash passes outwardly across the layer 26'' of hollow RO fibers, any trapped particulate matter trapped therein will be dislodged and removed, and as the flow continues the precoat layer 62'' will be removed in its entirety. After the filter vessel 11 has been drained, the drain valve 104 is closed, and the tank begins to refill with liquid, which passes in reverse flow through the filter elements 18''. After the filter vessel fills to a level above the tops of the filter elements 18'', the valves 110, 114 in the air line 112 and backwash line 116 are closed, and the backwash water is removed from the vessel 11 by opening the valve 104. The last backwash sequence may be repeated a plurality of times at different flow rates as is necessary to adequately clean the filter elemelts 18''. The backwash valve 114 is opened, and the filter vessel 11 is permitted to fill with water. After the filter vessel 11 has filled, vent 25 and valve 114 are closed, and the filter vessel 11 is now ready for application of a new precoat layer 62'', as previously described. The above described backwash technique may be similarly utilized to backwash filter elements 18 and 18'.

The unique method and apparatus of the present invention for treating liquid utilizing reverse osmosis techniques, as hereinabove discussed, maximizes the utilization of hollow RO fibers in a liquid treatment system. The invention provides better flow distribution through the hollow RO fibers by directing the flow of feedstream liquid from the outside of the wound layer of fibers towards a central core. This flow pattern minimizes the loss of concentrate velocity due to the removal of the permeate flow by compensating reduction in area. The invention permits the inclusion of multiple hollow fiber RO filter elements in a single pressure vessel. Further, the addition of an outer filter septum around the layer of hollow RO fibers, permits the prefiltering of the liquid feedstream within the pressure vessel. This reduces space requirements and equipment costs by combining the functions of filtration and reverse osmosis. Additionally, the pressure vessel and filter element configuration permits the use of various air and/or water backwashing techniques which are much more efficient than those currently used in other RO elements.

Obviously, many modifications and variations of the invention as hereinabove set forth will occur to those skilled in the art, and it is intended to cover in the appended claims all such modifications and variations as fall within the true spirit and scope of the invention.

What is claimed is:

1. A method for removing dissolved solids and suspended particuate matter from a liquid to be treated, comprising the steps of:
    (a) passing a feedstream of liquid to be treated into a pressure vessel having a plurality of filter elements vertically positioned therein;
    (b) directing the liquid to be treated through an outer filter septum positioned around the filter elements for removal of suspended particulate matter in the liquid to be treated;
    (c) directing the liquid to be treated that passes through the filter septum through a layer of hollow RO fibers spirally wrapped around formaninous center cores of the filter elements such that the liquid to be treated flows in a direction from the outside of the filter elements towards the foraminous center cores, so as to cause substantially pure permeate liquid to permeate into the center bores of the hollow RO fibers and concentrate liquid to pass into the foraminous center cores;
    (d) collecting the permeate liquid from the center bores of the hollow RO fibers in a common collector manifold and removing the collected permeate liquid from the pressure vessel;
    (e) collecting at least a portion of the concentrate liquid from the center cores in a common concentrate liquid collection compartment and removing the collected concentrate liquid from the pressure vessel;
    (f) periodically terminating passage of the liquid to be treated into the pressure vessel and directing backwash liquid into the concentrate liquid collection compartment and then across the layer of hollow RO fibers and the filter septum into the pressure vessel, so as to remove particular matter that is trapped in the hollow RO fibers and the filter septum and;
    (g) removing the backwash liquid along with the suspended particulate matter from the pressure vessel.

2. The method as defined in claim 1 including the further step of facing the portions of the hollow RO fibers adjacent the upper ends of the filter elements so as to permit the permeate liquid to pass through such faced portions into the collector manifold.

3. The method as defined in claim 2 including the step of maintaining the remaining portions of said hollow RO fibers in an unfaced state so as to preclude the permeate liquid from exiting from the hollow RO fibers.

4. The method as defined in claim 1 wherein the filter septum is an inert fibrous material spirally wrapped around the layer of RO fibers.

5. The method as defined in claim 1 wherein the filter septum is a precoat layer of filter aid material applied around the layer of RO fibers and the backwash liquid passing across the layer of RO fibers removes the precoat filter aid material along with the suspended particulate matter trapped in the layer of hollow RO fibers.

6. An apparatus for removing dissolved solids and suspended particulate matter from a liquid to be treated, comprising:
    (a) a pressure vessel having a tube sheet which divides said pressure vessel into an upper influent compartment and a lower concentrate compartment and a collector manifold which is positioned in an upper portion of said influent compartment;
    (b) a plurality of vertically extending filter elements each extending between said tube sheet and said collector manifold, said filter elements each having foraminous center cores which extend through said tube sheet into and in fluid communication with said concentrate compartment;
    (c) a layer of hollow RO fibers spirally wrapped around said center cores, said hollow RO fibers having center bores in fluid communication with said collector manifold;
    (d) a filter septum means positioned around each of said layers of hollow RO fibers for removing suspended particulate matter from liquid passing therethrough;
    (e) means for directing a feedstream of liquid to be treated under pressure into said influent compartment of said pressure vessel such that the liquid to be treated flows in a direction from the outside of the filter elements through said filter septum means for removing particulate matter and then through said layer of hollow RO fibers for causing substantially pure permeate liquid to permeate into the center bores of said hollow RO fibers and concentrate liquid to pass into said foraminous center cores;

(f) means for directing the permeate liquid in the center bores of said hollow RO fibers into said collector manifold and removing the permeate liquid in said collector manifold from said pressure vessel;

(g) means for directing the concentrate liquid in said foraminous center cores into said concentrate compartment and removing at least a portion of the concentrate liquid in said concentrate compartment from said pressure vessel; and (h) backwash means for periodically passing backwash liquid into said concentrate compartment and up into said foraminous center cores and then outward across said layer of hollow RO fibers and said filter septum means into said influent compartment for removing particular matter that is trapped in said hollow RO fibers and the filter septum means.

7. The invention as defined in claim 6 wherein a tube sheet is provided to divide said pressure vessel into an upper influent compartment and a lower concentrate compartment, said filter elements being positioned within said influent compartment and having open lower ends which extend through said tube sheet into said concentrate compartment so as to direct concentrate liquid from said foraminous central cores into said concentrate compartment.

8. The invention as defined in claim 6 wherein a liquid feedstream line is provided to direct liquid to be treated into said influent compartment.

9. The invention as defined in claim 8 wherein a concentrate outlet line is provided to remove concentrate liquid from said concentrate compartment.

10. The invention as defined in claim 9 wherein portions of said hollow RO fibers are faced so as to permit removal of permeate liquid therefrom into said collector manifold.

11. The invention as defined in claim 10 wherein said hollow RO fibers are faced adjacent the upper ends of said filter elements.

12. The invention as defined in claim 11 wherein a permeate outlet line is provided in said pressure vessel to receive permeate liquid from said collector manifold.

13. The invention as defined in claim 6 wherein inert fiberous material is applied as a layer around said layer of hollow RO fibers.

14. The invention as defined in claim 6 wherein said filter septum means includes a layer of precoat filter aid material applied around said layer of hollow RO fibers and said backwash liquid passing across said layer of hollow RO fibers removes said layer of precoat filter aid material from said filter elements.

15. The invention as defined in claim 14 wherein a means is provided to pass a slurry of precoat filter aid material into said influent compartment to apply a layer of precoat filter aid material around said layer of hollow RO fibers.

* * * * *